United States Patent [19]

Zievers et al.

[11] Patent Number: 4,713,174

[45] Date of Patent: Dec. 15, 1987

[54] MOUNTING ARRANGEMENT FOR A TUBE-TYPE FILTER ELEMENT

[75] Inventors: James F. Zievers, LaGrange; Paul Eggerstedt, North Riverside, both of Ill.

[73] Assignee: Industrial Filter & Pump Mfg. Co., Cicero, Ill.

[21] Appl. No.: 888,126

[22] Filed: Jul. 22, 1986

[51] Int. Cl.⁴ .................... B01D 27/08; B01D 35/30
[52] U.S. Cl. .................... 210/233; 210/249; 210/323.2; 55/379
[58] Field of Search ............ 210/232, 233, 249, 323.2; 55/378, 379

[56] References Cited

U.S. PATENT DOCUMENTS

| | | | |
|---|---|---|---|
| 2,434,958 | 1/1948 | Quinn | 210/232 |
| 2,862,622 | 12/1958 | Kircher, Jr. et al. | 55/379 |
| 3,513,638 | 5/1970 | Young | 55/379 |
| 3,550,359 | 12/1970 | Fisher et al. | 55/379 |
| 3,615,016 | 10/1971 | Soriente et al. | 210/323.2 |
| 3,642,141 | 2/1972 | Hobson, Jr. | 210/323.2 |
| 3,830,043 | 8/1974 | Nielsen et al. | 55/378 |
| 4,253,856 | 3/1981 | Paucha | 55/379 |
| 4,322,293 | 3/1982 | Morgan, Jr. | 210/323.2 |
| 4,504,288 | 3/1985 | Kreft | 55/379 |
| 4,526,689 | 7/1985 | Morgan | 210/323.2 |

FOREIGN PATENT DOCUMENTS 2127360 10/1972 France ................. 210/323.2

*Primary Examiner*—Richard V. Fisher
*Assistant Examiner*—Richard D. Jordan
*Attorney, Agent, or Firm*—Edmond T. Patnaude

[57] ABSTRACT

Apparatus for filtering a fluid or gas stream under pressure includes a tank having inlet and outlet ports with a tube sheet disposed therebetween. The tube sheet supports one or more generally elongate filter tubes disposed in tube sheet apertures arranged in spaced relation one to another. Each filter tube has a flange which is sealed to the tube sheet by an annular gasket which expands as its temperature rises. The tube sheet is provided with upstanding circular wall members circumscribing the filter tube apertures. The inside diameter of the wall members is larger than the outside diameter of the filter tube flange forming a recess within which the flange is receivable. A plurality of through holes in the wall members receive pins extending across the filter tube flanges.

8 Claims, 4 Drawing Figures

MOUNTING ARRANGEMENT FOR A TUBE-TYPE FILTER ELEMENT

BACKGROUND OF THE INVENTION

1. Field of the Invention

The present invention relates generally to filtration apparatus for removing particulates from a liquid or gas stream, and it relates more particularly to a new and improved mounting arrangement for a tube-type filter element used in such apparatus.

2. Description of the Prior Art

Filtration apparatus having tube-type filter elements are found in a variety of industrial and commercial applications wherein purification of liquids or gas streams is being performed. Typically, such apparatus includes a vertically mounted tank having a lower inlet port and an upper outlet port with one or more generally elongate filter tubes mounted therebetween and suspended within the tank from a tube sheet. The filter tubes are constructed of a porous material, such as ceramic and extend through apertures formed in the tube sheet arranged in spaced relation one to another. The filter tubes have closed ends and fluid entering the inlet port of the filter tank must pass through the walls of the filter tubes to reach the outlet port of the filter. Solids suspended within the liquid or gas stream are thereby deposited on the walls of the filter tubes and thus are removed from the fluid or gas stream.

With continued use of the filtration apparatus, solid matter accumulates on the walls of the filter tubes to such a degree that a filter cake is formed and cleaning or replacement of the filter tubes is necessitated. To effect such replacement, it is known to construct the filter tubes such that they each have an integral annular flange at their upper ends with a gasket disposed between the lip of the flange and the upper surface of the tube sheet. A bolt and washer arrangement can then be used to secure the flange to the tube sheet when the filter tube is properly positioned within its respective tube sheet aperture.

A disadvantage of the foregoing arrangement for mounting the filter tubes is that a bolt and washer arrangement renders it difficult to maintain the filter tube in sealed relation to the tube sheet over the broad range of temperatures to which the filtration apparatus is subjected. In this regard, the effects of differential expansion as between the tube sheet and filter tube materials, respectively, can cause leakage to occur at the gasket between the tube sheet and filter tube. In addition, since the filter tube is typically constructed of a brittle ceramic material, a bolt and washer arrangement can cause fracturing of the filter tube flange if installation of the filter tube is not performed with care.

In co-pending application, Ser. No. 827,738, filed Feb. 10, 1986, assigned to the assignee of the present invention, filter apparatus is disclosed wherein a filter tube is provided with a cylindrical hub having a diameter greater than the diameter of the body portion of the tube. The juncture of the hub and body portion defines an annular surface which is cooperable with an annular surface provided in the aperture of the tube sheet to form an interface between the tube sheet and filter element. An annular gasket is interposed between the surfaces of the tube sheet aperture and the filter tubes. A plurality of removable pins extend through the tube sheet and into each of the hubs to secure the hubs of the filter tubes in place. While such an arrangement prevents damage to the filter tubes and ensures a proper seal between the filter tube and tube sheet, it would be desirable to further simplify the construction of the filter tube and tube sheet mounting configuration whereby the filter tubes are effectively sealed to the tube sheet over a wide range of temperatures and are also removable with greater convenience.

SUMMARY OF THE INVENTION

Briefly, there is provided in accordance with the teachings of the present invention a new and improved filter apparatus comprising a tank having an inlet port and an outlet port with a generally rigid tube sheet disposed within the tank and adapted to sealably partition the tank between the inlet and outlet ports. A tubular filter element is received by a circular aperture of the tube sheet and has at one end an integrally formed flange which is larger in diameter than the aperture in the tube sheet. The tube sheet is provided with an upstanding circular wall or ring member coaxially disposed with respect to the aperture. The wall member has an inside diameter which is larger than the outside diameter of the flange such that the flange is receivable within the wall member. An annular gasket which expands during operation of the filter provides a seal between the flange and the tube sheet. To secure the filter tube to the tube sheet, the wall member has a plurality of through holes formed therein which are adapted to receive a pin extending across the upper surface of the flange. Preferably, the gasket is formed of a material which expands with temperature so that when the temperature is increased during operation of the filter, the thickness of the gasket increases to force the top of the filter tube firmly against the pin and to provide a hermetic, positive seal between the filter element and the tube sheet during the filter cycle. Such a construction offers the advantages of an effective sealing arrangement and yet, before the gasket temperature is increased, permits easy assembly of the filter tube while substantially reducing the potential for damage to the brittle filter tube during mounting thereof to the tube sheet.

BRIEF DESCRIPTION OF THE DRAWINGS

The foregoing and other novel features of the present invention will be better understood by a reading of the following detailed description taken in connection with the accompanying drawings wherein.

Figure 1:
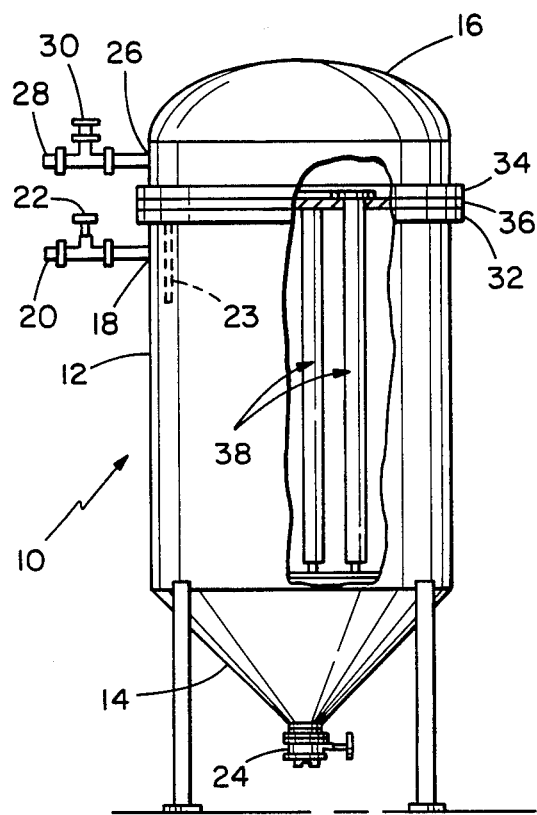
FIG. 1 is an elevational view, partially broken away, illustrating a vertical tube filter and the manner in which filter tubes embodying the present invention are mounted therewithin.

Referring now to the drawings, and in particular to FIG. 1 thereof, there is shown a multiple tube filter apparatus, designated generally by the reference numeral 10, including as its principle elements a generally cylindrical, vertically disposed tank 12 having a conical bottom portion 14 and a dome shaped upper cover 16.

Connected to a port 18 provided in the wall of the conical portion 14 is an inlet supply conduit 20 and valve 22 for admitting pressurized liquid or gas into the filter 10. A baffle 23 is mounted in the tank 12 directly opposite to the opening in the inlet 18. At its lowermost end, the conical section 14 is fitted with a drain-down valve 24 for purposes of emptying and cleaning the filter 10. Extending from a port 26 provided in the wall of the upper dome member 16 is a discharge conduit 28 and valve 30. Interposed between a flange 32 provided on the tank and a flange 34 provided on the domed section 16 is a generally flat circular tube sheet 36. The tube sheet 36 is compressed between the flanges 32 and 34 and is sealed therebetween by suitable gaskets and fastening means (not shown) in a manner well known in the art. The tube sheet 36 supports a plurality of generally elongate filter tubes 38 extending downwardly therefrom in a generally vertical disposition.

Figure 2:
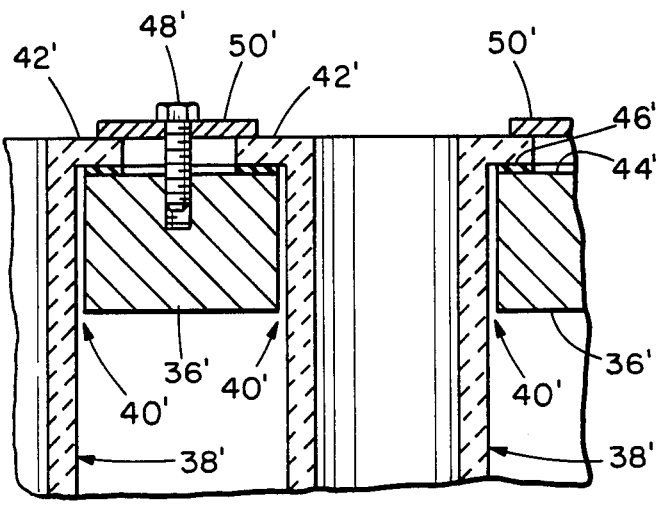
FIG. 2 is a fragmentary, sectional view illustrating view of a tube sheet having a prior art means for mounting a filter tube to a tube sheet in the filter illustrated in FIG. 1.

Turning now to FIG. 2, there is illustrated a prior art means for securing filter tubes to a tube sheet in filtering apparatus of the type illustrated in FIG. 1. The tube sheet 36' can be seen therein to include a plurality of relatively straight walled vertical apertures 40', 40' suitably dimensioned to slidably receive a respective filter tube 38'. Each filter tube 38' has an annular flange 42' formed at its upper end overlying a portion 44' of the generally flat upper surface of the tube sheet 36'. Interposed between the flange 42' and the upper surface 44' of the tube sheet 38' is a generally annular gasket 46'. In order to compress the flange 42' into sealing engagement with the gasket 46', the prior art assembly includes a bolt 48' which is threadedly received by the tube sheet 36' and bears against a washer 50' which, in turn, is compressed against the flange 42' of the filter tube 38'. In practice, the apertures 40', 40' of the tube sheet 36' may be spacially arranged such that a single bolt 48' and washer 50' is capable of securing as many as three filter tubes 38' within their respective apertures 40', 40'.

Figure 3:
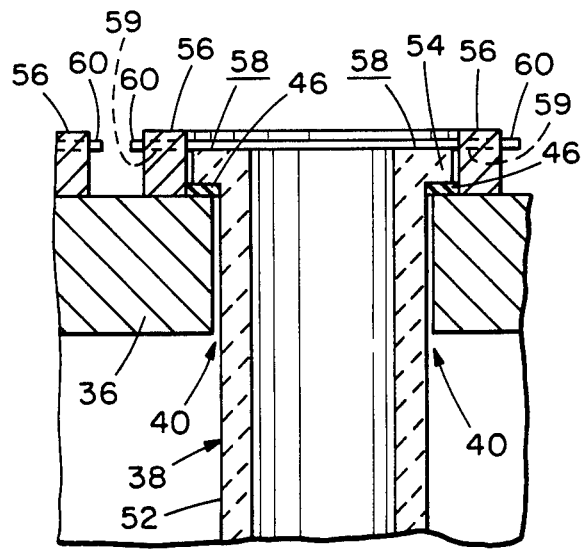
FIG. 3 is a fragmentary, sectional view of a filter tube mounting means constructed in accordance with the principles of the present invention.
Figure 4:
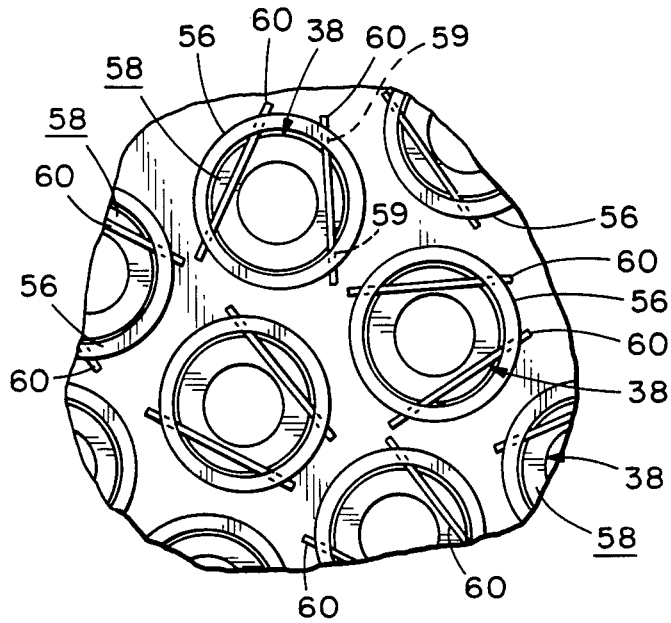
FIG. 4 is a top fragmentary plan view of the filter tube mounting means illustrated in FIG. 3.

With reference now to FIGS. 3 and 4, wherein the preferred embodiment of the present invention is illustrated, there is shown a filter tube 38 having a generally cylindrical straight walled, cylindrical body portion 52, terminated at its lowermost, or distal end with a cap (not shown) and having an annular flange 54 at its uppermost, or proximal, end. As in the case of the prior art assembly of FIG. 2, the tube sheet 36 is provided with a plurality of generally straight walled apertures 40 (only one is shown) which are so dimensioned as to slidingly receive the straight walled portions 52 of the filter tubes 38. In addition, the tube sheet 36 is formed with upstanding circular wall or ring members 56 circumscribing each aperture 40. Preferably, the wall members 56 each have an inside diameter which is slightly larger than the outside diameter of the flange 54 of the filter tube 38, and thereby each filter tube 38 may be inserted into a respective aperture 40 of the tube sheet 36 such that the flange 54 rests on an annular gasket 46 which, in turn, is positioned on the tube sheet 36 around each aperture 40 as is more fully described hereinafter, the gasket material is selected so that the gasket expands with temperature rise during use of the filter.

In order to secure the filter tubes 38 in place in their respective apertures 40, the upstanding wall members 56 are each configured such that they each extend upwardly, as viewed in FIG. 3, for example, beyond the upper surface 58 of the associated filter tube 38. The wall members 56 are also provided with pairs of axially aligned through holes 59 sized to receive metal pin members 60 which extend transversely of the wall members 56 across the upper surfaces 58 of the associated filter tubes 38. A preferable arrangement for the locations of the through holes 59 is shown in FIG. 4 wherein the metal pin members 60 are skewed with respect to one another and can be removed with a pair of pliers, or the like, by sliding them out of their respective holes 59 into the spaces provided between adjacent wall members 56. The holes 59 may be spaced from the top surface of the tube sheet so that the pins 60 are spaced from the tops of the associated filter tubes when the gaskets are at about room temperature or are otherwise in a non-expanded state, or they may be located such that a small degree of compression of the gasket is required to permit insertion of the pins 60 through the holes 59.

Operation

When it is desired to install a filter tube 38 into its respective aperture 40 of the tube sheet 36, the filter tube 38 is simply inserted into the position illustrated in FIG. 3, for example, wherein the flange 54 is resting on its associated gasket 46. A pin member 60 can be inserted through respective holes 60 formed in the upstanding wall member 56 surrounding the tube sheet aperture 40 because the gasket being at room temperature, say 75 degrees F., is in a non-expanded state and the top of the element 38 is below the holes 59. A gasket material having a thermal expansion property suitable for use in the disclosed embodiment, say about 2.5 to 1 at about 1100 degrees F., is available under the brand name Interam from the Ceramics Materials Division of 3M Corporation, St. Paul, Minnesota. Of course, when it is desired to remove the filter tubes 38 for cleaning or replacement, the afore-described process is simply reversed. It can thus be appreciated that the preferred embodiment of the present invention provides not only a convenient but a highly effective means for securing a filter tube 38 within a tube sheet 36 of a filter 10.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed as new and desired to be secured under Letters Patent of the United States is:

1. Filter apparatus comprising
   a tank having means defining an inlet port and means defining an outlet port;
   a generally rigid tube sheet disposed within said tank and adapted to sealably partition said tank between said inlet and outlet ports;
   a tubular filter element formed of a porous material for filtering fluid admitted to said tank, said filter element having a hollow, generally cylindrical body portion, said body portion having a proximal end and a distal end;
   said distal end being closed;
   said proximal end having an integrally formed annular, external flange;
   said tube sheet having a circular aperture for receiving said cylindrical body portion of said filter element and further having an upstanding circular wall member coaxially disposed with respect to said aperture;

said wall member having an inside diameter which is larger than the outside diameter of said flange to receive said flange therewithin;

annular sealing means disposed between said flange and said tube sheet;

said wall member having means defining a plurality of through holes; and pin means extending through said holes across the top of said filter elements, said pin means bearing against the proximal end of said filter element, whereby said flange is held by said pin means against said sealing means to form a fluid tight seal between said filter element and said tube sheet.

2. Apparatus according to claim 1 wherein said pin means comprises a plurality of pins extending across the proximal end of said filter element to compress said flange against said sealing means.

3. Apparatus according to claim 1 wherein said sealing means comprises a unitary piece of high temperature gasket material having a thickness which increases as the temperature of said gasket material is increased.

4. Apparatus according to claim 1 wherein said sealing means has a given thickness which expands during operation of said apparatus at elevated temperatures above room temperature.

5. Apparatus according to claim 1 wherein said plurality of through holes comprises at least two pairs of axially aligned holes.

6. Apparatus according to claim 5 wherein the respective axes of said two pairs of holes do not overlie the inside diameter of said cylindrical body portion of said filter element.

7. Apparatus according to claim 5 wherein said sealing means comprises a unitary piece of material having a thickness which increases with the temperature thereof.

8. Apparatus according to claim 3 wherein the bottom portions of said plurality of through holes extend above said top of said filter element wherein said pin means is spaced from said proximal end of said filter element when gasket material is at about room temperature.

* * * * *